(12) United States Patent
Ozawa (10) Patent No.: US 12,025,216 B2
(45) Date of Patent: Jul. 2, 2024

(54) VEHICLE CONTROL SYSTEM

(71) Applicant: TOYOTA JIDOSHA KABUSHIKI KAISHA, Toyota (JP)

(72) Inventor: Kazuhiro Ozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/484,477

(22) Filed: Oct. 11, 2023

(65) Prior Publication Data

US 2024/0159311 A1 May 16, 2024

(30) Foreign Application Priority Data

Nov. 14, 2022 (JP) ................. 2022-182064

(51) Int. Cl.
*F16H 59/08* (2006.01)
*F16H 59/02* (2006.01)
*F16H 59/10* (2006.01)

(52) U.S. Cl.
CPC ..... *F16H 59/08* (2013.01); *F16H 2059/0221* (2013.01); *F16H 2059/082* (2013.01); *F16H 59/10* (2013.01)

(58) Field of Classification Search
CPC .. F16H 59/08; F16H 59/10; F16H 2059/0221; F16H 2059/082
See application file for complete search history.

(56) References Cited

U.S. PATENT DOCUMENTS

2013/0327173 A1\* 12/2013 Iwata ................. F16H 61/24
74/473.12

FOREIGN PATENT DOCUMENTS

| CN | 102365480 A | \* | 2/2012 | ........... F16H 59/105 |
| EP | 3260740 A1 | \* | 12/2017 | ........... F16H 59/105 |
| JP | 2013-154700 A | | 8/2013 | |
| WO | WO-2015145229 A1 | \* | 10/2015 | ......... F16H 59/0204 |

\* cited by examiner

*Primary Examiner* — Justin Holmes
(74) *Attorney, Agent, or Firm* — Oblon, McClelland, Maier & Neustadt, L.L.P.

(57) ABSTRACT

A control system for preventing a drop in driving force in a vehicle having a momentary type shifting device. In the shifting device, the N position corresponding to the N range and the default position are located between the D position corresponding to the D range and B position corresponding to the B range. The controller is configured to establish the neutral range in a case that the shift lever which is moved to the N position is maintained thereto for the threshold, and the neutral range maintaining action is executed after the lapse of the threshold time.

2 Claims, 6 Drawing Sheets

PRIOR ART

VEHICLE CONTROL SYSTEM

CROSS-REFERENCE TO RELATED APPLICATIONS

The present disclosure claims the benefit of Japanese Patent Application No. 2022-182064 filed on Nov. 14, 2022 with the Japanese Patent Office, the disclosures of which are incorporated herein by reference in its entirety.

BACKGROUND

Field of the Disclosure

Embodiments of the present disclosure relate to the art of a control system for a vehicle having a shifting device for manually shifting a shift range of an automatic transmission mounted on a vehicle, and more particularly, to a control system for a vehicle having a momentary type shifting device that is actuated momentary by operating a shift lever or a selector lever that is returned to a default position (or a neutral position) by releasing a hand.

Discussion of the Related Art

JP-A-2013-154700 discloses a shifting device for a vehicle that can be operated easily to shift a shift range. The shifting device described in JP-A-2013-154700 includes a momentary shift lever that is normally positioned at a neutral position (default position). In a shift pattern of the shift lever, an N position (neutral position) is located between a default position and the D position (forward drive position) or the R position (reverse drive position). The shifting device of the vehicle described in JP-A-2013-154700 is configured to shift a shift range to a target shift range in accordance with a position of the shift lever. According to the teachings of JP-A-2013-154700, specifically, generation of an N range signal is started when the shift lever is moved from the default position to the N position, and an N range request signal is generated after the lapse of a first period of time from the start of generation of the N range signal. Thereafter, a target shift range is set to an N range corresponding to the N position after the lapse of a second period of time from the start of generation of the N range request signal.

As described above, in the shifting device of the vehicle described in JP-A-2013-154700, the N range is set in response to the operation of the shift lever to the N position, and based on the lapse of the first period of time and the second period of time for determining the generations of the N range signal and the N range request signal, respectively. To this end, the first period of time and the second period of time are set in advance on the basis of an experimental measurement or the like so as to improve the operability for the driver. For example, it is possible to shorten a time for holding the shift lever to the N position for the purpose of setting the N range by shortening the first period of time. Likewise, it is possible to shorten a time required to set the N range by shortening the second time. However, if the first period of time and the second period of time (that is, the determination time for determining the start of setting the N range) are short, the N range would be set more than necessary. Therefore, the N range would be set contrary to the intention of the driver thereby interrupting the power transmission unintentionally. That is, a driving force to propel the vehicle drops unintentionally.

As can be seen from FIG. 3 of JP-A-2013-154700, the shift lever of the shifting device described in JP-A-2013-154700 is moved between the D position and the B position (decelerating position) via the N position. Therefore, if the time for determining of the N range is short, the N range may be set temporarily every time the shift lever passes through the N position. Specifically, if the shift lever is operated and the N range is temporarily set during propulsion of the vehicle, the power transmission to drive wheels will be interrupted thereby reducing the driving force temporarily. In this situation, the driver would be frustrated.

SUMMARY

Aspects of embodiments of the present disclosure have been conceived noting the foregoing technical problems, and it is therefore an object of the present disclosure to provide a vehicle control system that is applied to a vehicle having a momentary type shifting device for manually shifting a shift range of an automatic transmission, and that is configured to shift a shift range while preventing a drop of a driving force when a shift range is shifted via a neutral position during propulsion.

According to the exemplary embodiment of the present disclosure, there is provided a vehicle control system, comprising: an automatic transmission mounted on a vehicle; a momentary type shifting device having an operating device that is operated manually by a driver along a predetermined guide route; and a controller that controls the automatic transmission in response to an operation of the shifting device. A shift range of the automatic transmission is selectable at least from: a forward drive range in which the vehicle is propelled forward at a normal speed ratio; a deceleration drive range in which the vehicle is propelled forward at a speed ratio that is relatively larger than that in the forward drive range, and a neutral range in which a power transmission is interrupted. Specifically, the shifting device is activated only when the operating device is moved from a default position to a desired shift position thereby establishing the shift range corresponding to the desired shift position of the operating device, and inactivated by releasing the operating device to return the operating device to the default position. In the predetermined guide route, a neutral position corresponding to the neutral range and the default position are located between a drive position corresponding to the forward drive range and a deceleration drive position corresponding to the deceleration drive range. In order to achieve the above-explained objective, according to the exemplary embodiment of the present disclosure, the controller is configured to establish the neutral range in a case that the operating device which is moved to the neutral position is maintained to the neutral position for a threshold time for determining an execution of an operation of the operating device to the neutral position, and that a neutral range maintaining action is executed after a lapse of the threshold time.

In a non-limiting embodiment, the controller may be further configured to establish the neutral range in a case that the operating device is moved from the drive position or the deceleration drive position to the neutral position, that the operating device is maintained to the neutral position for the threshold time, and that the neutral range maintaining action is executed after the lapse of the threshold time.

In a non-limiting embodiment, the neutral range maintaining action may include an operation to return the operating device from the neutral position to the default position.

In a non-limiting embodiment, the neutral range maintaining action may include an operation to maintain the operating device to the neutral position for a delay threshold time for determining an execution of the neutral range maintaining action.

In a non-limiting embodiment, the controller may be further configured to establish the neutral range after a delay time which is shorter than the delay threshold time, in a case that the operating device is moved from the neutral position to the default position or a position other than the drive position and the deceleration drive position before a lapse of the delay threshold time.

The control system according to the exemplary embodiment of the present disclosure is applied to a vehicle having an automatic transmission and a shifting device for manually shifting the shift range of the automatic transmission, and a shift range of the automatic transmission is shifted among the drive range, the deceleration drive range, and the neutral range by manipulating the shifting device. According to the exemplary embodiment of the present disclosure, the momentary type switching device is employed as the shifting device, and the operating device thereof is returned to the default position by releasing a hand from the operating device to inactivate the shifting device. As described, in the guide route of the shifting device, the neutral position and the default position are located between the drive position and the deceleration drive position. That is, the operating device of the shifting device inevitably passes through the neutral position when shifting the shift range of the automatic transmission between the drive range and the deceleration drive range. Therefore, if a determination period or a determination condition for determining an execution of the shifting operation to the neutral position is inappropriate is inappropriate, it would take longer time to shift the shift range to the neutral range. In addition, the shift range would be shifted unintentionally to the neutral range to cause a temporal drop in the driving force during propulsion. In order to avoid the above-explained problems, according to the exemplary embodiment of the present disclosure, the controller is configured to establish the neutral range in a case that the operating device which is moved to the neutral position is maintained to the neutral position for the threshold time for determining an execution of an operation of the operating device to the neutral position, and a neutral range maintaining action is executed after the lapse of the threshold time.

Specifically, according to the exemplary embodiment of the present disclosure, the control system is configured to execute the shifting control to the neutral range based on the threshold time to determine an execution of an operation of the shifting device to the neutral position and the neutral range maintaining action as a determination condition, when the operating device is moved from the drive position or the deceleration drive position to the neutral position. For example, the control system executes the shifting control to the neutral range when the operating device is moved from the drive position to the deceleration drive position via the neutral position during forward propulsion, or when the operating device is moved from the deceleration drive position to the drive position via the neutral position during forward propulsion. According to the exemplary embodiment of the present disclosure, therefore, it is possible to appropriately determine the timing to shift the shift range of the automatic transmission to the neutral range. For this reason, a temporal drop in the driving force during propulsion can be prevented certainly, and hence the driver will not feel any uncomfortable feeling due to such drop in the driving force during propulsion.

The control system is further configured to execute the shifting control to the neutral range when the operating device of the shifting device is returned from the neutral position to the default position. For example, the control system executes the shifting control to the neutral range when the driver releases his/her hand from the operating device thereby returning the operating device to the default position. That is, when the operating device is moved to the position other than the neutral position and the default position, the shift range is shifted to the position other than the neutral position without establishing the neutral position even after the lapse of the threshold time. According to the exemplary embodiment of the present disclosure, therefore, the time to determine an execution of the shifting operation to the neutral range can be shortened so that the shift range can be shifted to the neutral range promptly. In addition, a temporal drop in the driving force may also be prevented.

The control system is further configured to execute the shifting control to the neutral range in the case that the operating device is still maintained to the neutral position for the delay threshold time even after the lapse of the threshold time. Specifically, the control system shifts the shift range to the neutral range after the lapse of the delay threshold time in the case that the operating device moved to the neutral position is still maintained to the neutral position for the threshold time. According to the exemplary embodiment of the present disclosure, therefore, the time to determine an execution of the shifting operation to the neutral range can be shortened so that the shift range can be shifted to the neutral range promptly. In addition, a temporal drop in the driving force may also be prevented.

The control system is further configured to execute the shifting control to the neutral range in the case that the operating device is moved from the neutral position to the default position or the position other than the drive position and the deceleration drive position before the lapse of the delay threshold time. For example, in the case that the operating device is moved from the neutral position to the reverse position, the shift range is shifted to the neutral position before the lapse of the delay threshold time. According to the exemplary embodiment of the present disclosure, therefore, the delay time to shift the shift range to the neutral range may be shortened.

Thus, according to the exemplary embodiment of the present disclosure, the temporal drop in the driving force can be prevented certainly in the situation where the operating device of the momentary type shifting device is moved via the neutral position.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure, and do not limit the present disclosure.

Figure 1:
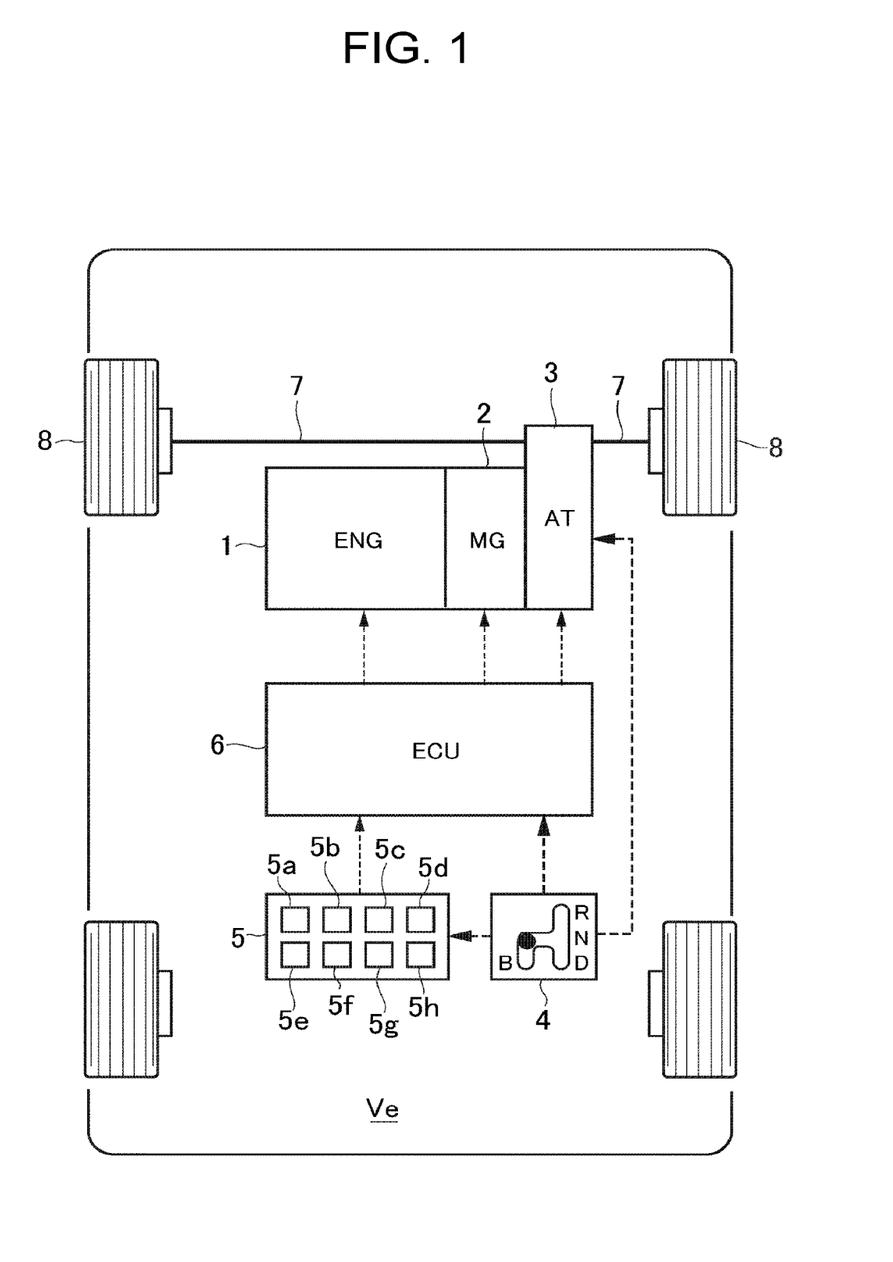
FIG. 1 is a schematic illustration showing a structure and a control system of the vehicle to which the control system according to the present disclosure is applied.

Turning now to FIG. 1, there is shown one example of a powertrain of a vehicle Ve to which the control system according to the embodiment of the present disclosure is applied. The vehicle Ve shown in FIG. 1 is a hybrid vehicle in which a prime mover includes an engine (ENG) 1 and a motor (MG) 2. The vehicle Ve comprises an automatic transmission (AT) 3, a shifting device 4, a detector 5, and a controller (ECU) 6. In the vehicle Ve, a shift range (i.e., a gear stage or power transmission mode) of the automatic transmission 3 is selected or shifted by manually operating the shifting device 4.

For example, an internal combustion engine such as a gasoline engine and a diesel engine may be adopted as the engine 1, and the engine 1 may be activated and inactivated electrically. In addition, an output power of the engine 1 may also be controlled electrically.

The motor 2 translates electrical energy into mechanical energy (or rotational energy), and translates mechanical energy (or rotational energy) into electrical energy. For example, a permanent magnet synchronous motor, an induction motor or the like may be adopted as the motor 2. That is, the motor 2 is a so-called motor-generator serving not only as a prime mover but also as a generator.

Note that the control system according to the embodiment of the present disclosure may also be applied to a vehicle (not shown) in which only an engine is employed as a prime mover, and an electric vehicle (not shown) in which the motor 2 serving as a prime mover is combined with the automatic transmission 3.

The vehicle Ve shown in FIG. 1 is a front drive layout vehicle in which a drive torque is delivered to a pair of front wheels 8 through driveshafts 7 to propel the vehicle Ve. Nonetheless, the control system according to the embodiment of the present disclosure may also be applied to a rear drive layout vehicle (not shown) in which a drive torque is delivered to a pair of rear wheels through e.g., a propeller shaft (not shown) to propel the vehicle. Further, the control system according to the embodiment of the present disclosure may also be applied to a four-wheel drive layout vehicle (not shown) in which a drive torque is distributed to both pairs of front and rear wheels to propel the vehicle.

The automatic transmission 3 is arranged between the prime mover and the drive wheels to transmit an output torque of the prime mover to the drive wheels while changing a rotational speed of the output shaft (not shown) of the prime mover. In the example shown in FIG. 1, the automatic transmission 3 is connected to the engine 1 and an output side of the motor 2 so that output torques of the engine 1 and the motor 2 are transmitted to the front wheels 8 through the automatic transmission 3. Specifically, the automatic transmission 3 is a power transmission unit adapted to change a ratio of a rotational speed of the output shaft (not shown) to a rotational speed of an input shaft (not shown) arbitrarily. That is, the automatic transmission 3 is adapted to change a speed ratio or shift a gear stage automatically. A shift range of the automatic transmission 3 includes gear stages of different speed ratios, a neutral stage, and a reverse stage. According to the embodiment of the present disclosure, the shift range of the automatic transmission 3 may be selected at least from a drive range (D range), a brake range (B range), a neutral range (N range), and a reverse range (R range). The drive range (D range) is a forward drive range in which the vehicle Ve is propelled forward at a normal speed ratio. Whereas, the brake range (B range) is a "deceleration drive range" in which the vehicle Ve is propelled forward at a speed ratio that is relatively larger than that in the drive range (i.e., at a reduction ratio). That is, in the brake range, the vehicle Ve is propelled forward while establishing an engine braking force. In the neutral range, power transmission between the input shaft and the output shaft of the automatic transmission 3 is interrupted, and in the reverse range (R range), the vehicle Ve is reversed. The shift range of the automatic transmission 3 is selected in accordance with a shift position selected by an after-mentioned shift lever 4a of the shifting device 4 as an operating device.

Figure 2:
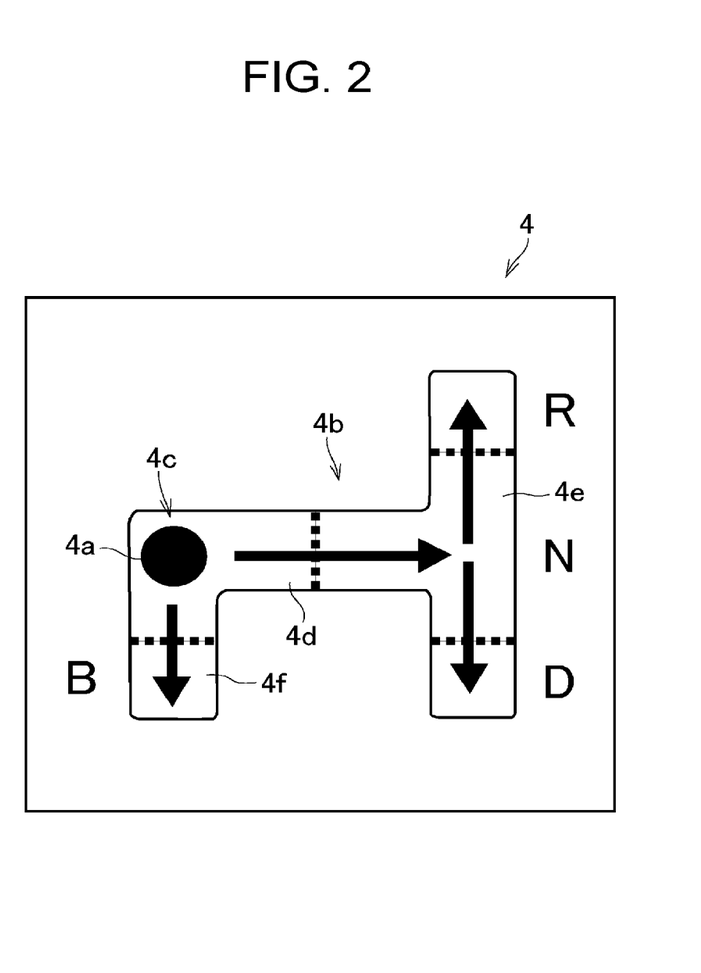
FIG. 2 is a schematic illustration showing one example of a shift pattern of the shifting device arranged in the vehicle to which the control system according to the present disclosure is applied.

As illustrated in FIG. 2, the shifting device 4 comprises the shift lever 4a and a shift pattern 4b. The shift lever 4a serves as an "operating device" of the shifting device 4 and is manually operated by the driver. The shift pattern 4b is a "guide route" of the shifting device 4, and the shift lever 4a is manually operated to be moved along a groove of the shift pattern 4b. In the embodiment shown in FIG. 2, the shift pattern 4b is an inverse "h" pattern, and the drive position (D position), the brake position (B position) as a deceleration drive position, and the reverse position (R position) are located at each leading end of the groove. In the shift pattern 4b, the neutral position (N position) is located between the R position and the D position in one of longitudinal grooves extending parallel to other one of the longitudinal grooves in which the B position is located at its end.

The shifting device 4 has a momentary switch structure. That is, the shifting device 4 is activated only when the shift lever 4a is moved manually from a default position 4c to the desired shift position, and inactivated by releasing the shift lever 4a to return the shift lever 4a automatically to the default position 4c. That is, the shift lever 4a is positioned at the default position 4c unless it is operated manually. Specifically, the default position 4c is located at the center of the shift pattern 4b, and the shift lever 4a is moved to the desired shift position from the default position 4c. In the example shown in in FIG. 2, the default position 4c is located at the left end of a transverse groove 4d of the shift pattern 4b extending in the horizontal direction in FIG. 2, and the N position is located at the right end of the transverse groove 4d. The longitudinal groove 4e extends vertically in the right side of the transverse groove 4d. In the longitudinal groove 4e, the R position is located at the upper end, the D position is located at the lower end, and the N position is located between the R position and the D position. The longitudinal groove 4f extends downwardly from the left end of the transverse groove 4d at which the default position 4c is located, and the B position is located at the lower end of the longitudinal groove 4f.

The shift pattern of the shifting device 4 according to the embodiment of the present disclosure should not be limited to the above-explained inverse "h" pattern. For example, an I-shaped shift pattern shown in FIG. 8 of JP-A-2013-154700 may also be employed in the shifting device 4. In addition, a toggle switch and a dial switch shown in FIG. 9 of JP-A-2013-154700 may also be employed as the shifting device 4. Further, a complete H-shaped shift pattern shown in FIG. 10 of JP-A-2013-154700 may also be employed in the shifting device 4. In this case, an upshifting position (+) and a downshifting position (−) may be arranged in the H-shaped shift pattern. In any of those shift patterns, the N position is located between the D position and the B position. Therefore, the shift lever 4a as the operating device of the shifting device 4 inevitably passes through the N position to shift the shift range of the automatic transmission 3 between the D range and the B range.

The automatic transmission 3 is a shift-by-wire transmission that is electrically connected to the shifting device 4. Therefore, when the shift lever 4a is manually operated and the shifting device 4 is turned ON, an ON signal of the shifting device 4 is transmitted to the automatic transmission 3. For example, when the shift lever 4a is moved manually to the D position, an electric junction (not shown) corresponding to the D position of the shifting device 4 is turned ON, and the ON signal is transmitted to the automatic transmission 3 via the controller 6. Consequently, an actuator (not shown) of the automatic transmission 3 is controlled based on the ON signal transmitted to the controller 6 to establish the D range in accordance with the ON signal representing the D position.

In order to collect data and information required to control the vehicle Ve, the detector 5 comprises a power supply unit, a microcomputer, a sensor, an input/output interface. According to the exemplary embodiment of the present disclosure, the detector 5 is adapted to collect various types of data for executing a shifting control of the automatic transmission 3 and for establishing the desired shift range of the automatic transmission 3 by the shift-by-wire system. To this end, specifically, the detector 5 comprises: a shift position sensor 5a that detects a position of the shift lever 4a, that is, a shift position selected by the shifting device 4; a shift range sensor 5b that detects a shift range established by the automatic transmission 3; and a timer 5c that counts an operating time, a waiting time and the like of the shift lever 4a. In addition, the detector 5 further comprises: a vehicle speed sensor 5d that detects a vehicle speed; an acceleration sensor 5e that detects an acceleration of the vehicle Ve; an accelerator pedal sensor 5f that detects an operating state (operation amount, operation speed, and the like) of an accelerator pedal (not shown); a brake pedal sensor 5g for detecting an operating state (e.g., operating amount and an operating speed) of a brake pedal (not shown); and a rotational speed sensor 5h that detects rotational speeds of the engine 1 and the motor 2. The detector 5 is electrically connected to a controller 6 so that the detection data collected by the above-mentioned sensors is transmitted to the controller 6 in the form of electric signal.

The controller 6 is an electronic control unit composed mainly of a microcomputer for controlling the vehicle Ve. According to the exemplary embodiment of the present disclosure, specifically, the controller 6 is configured to establish the shift range of the automatic transmission 3 by the shift-by-wire system in accordance with an operating condition of the shifting device 4. To this end, various data collected or calculated by the detector 5 is transmitted to the controller 6, and the controller 6 performs calculation using the incident data, data stored in advance, a calculation formula etc. The calculation result is transmitted from the controller 6 in the form of command signal to control the vehicle Ve. Although only one controller 6 is arranged in the vehicle Ve shown in FIG. 1, a plurality of controllers 6 may also be arranged in the vehicle Ve to control different devices individually, or to perform different controls individually.

Figure 3:
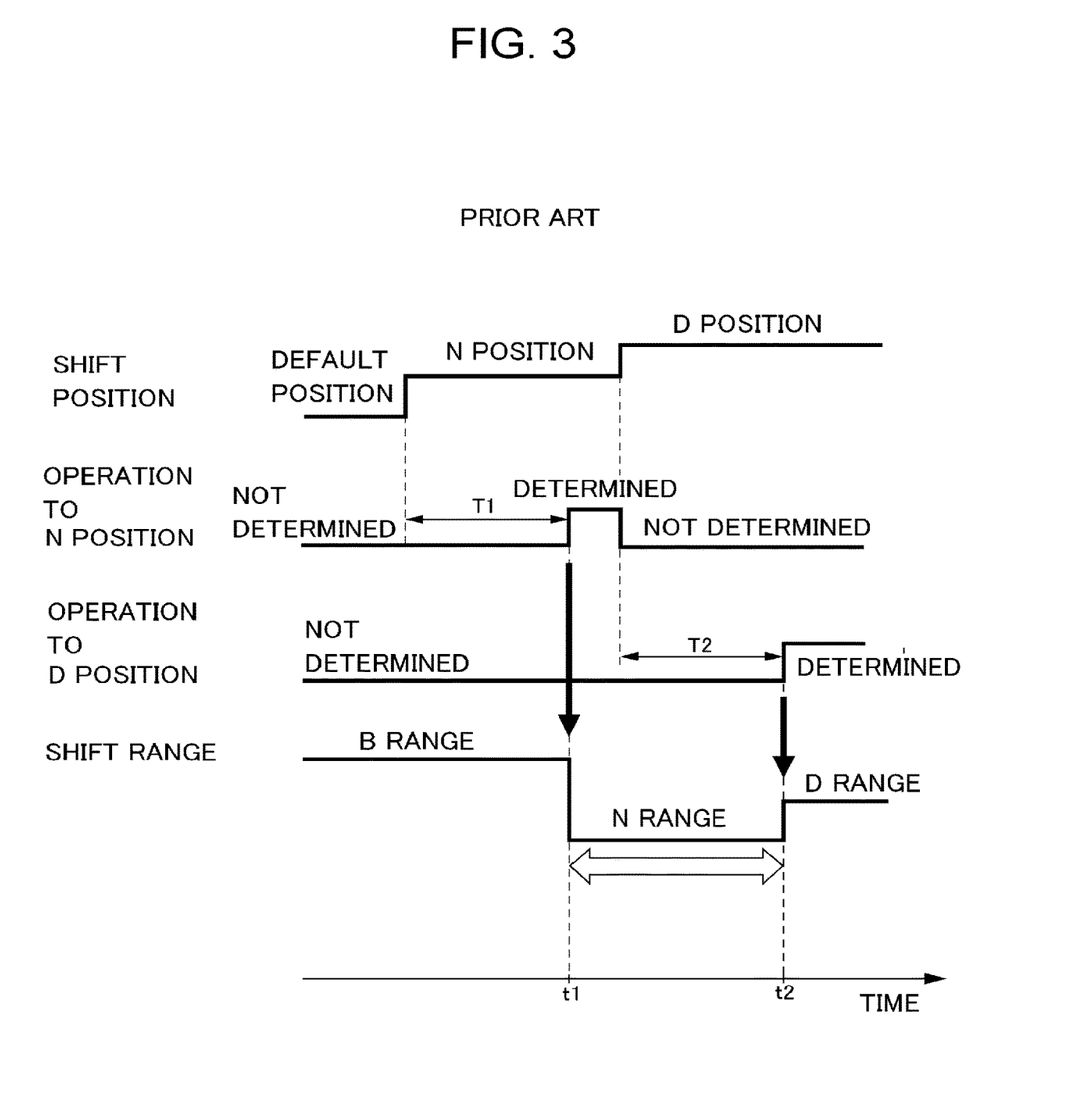
FIG. 3 is a time chart showing a situation in which driving force drops temporarily in the conventional vehicle when shifting the shift range between the D range and the B range.

As described above, in the shift pattern 4b of the shifting device 4 according to the exemplary embodiment of the present disclosure, the D position and the B position are arranged across the default position 4c and the N position. That is, when shifting the shift range of the automatic transmission 3 between the D range and the B range by manually moving the shift lever 4a between the D position and the B position, the shift lever 4a passes through the N position inevitably. Therefore, if a determination period for determining an execution of the shifting operation to the N position is inappropriate, or a determination period for determining a commencement of the shifting operation to the N range is inappropriate, it would take longer time to shift to the N range, or the driving force would drop temporarily during propulsion. FIG. 3 is a time chart showing a situation of a conventional transmission in a case of shifting the shifting range from the B range to the D range via the N range. If a period T1 for determining an execution of the operation of the shift lever 4a to the N position to start the switching operation to the N range is too short as in the example shown in FIG. 3, the shift range is shifted from the B range to the N range at point t1, and the N range is maintained to point t2. In this situation, therefore, the driving force is lost undesirably during propulsion. In FIG. 3, T2 is a period for determining an execution of the operation of the shift lever 4a to the D position after passing through the N position, and a shifting operation from the N range to the D range is started at point t2 after the lapse of the period T2.

Figure 4:
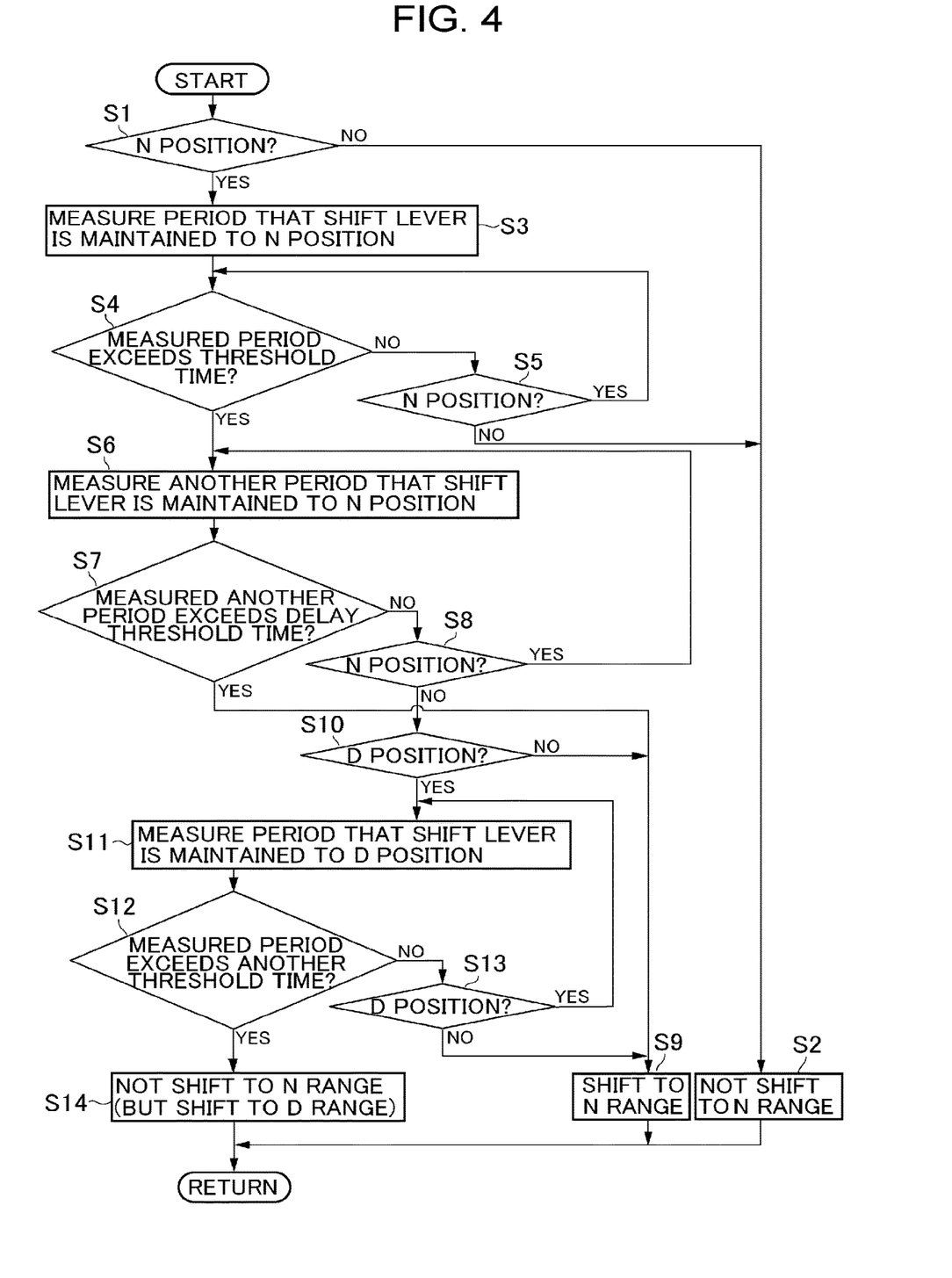
FIG. 4 is a flowchart showing one example of a routine executed by the control system according to the present disclosure.

In order to avoid such delay in shifting to the N range and undesirable reduction in the driving force, the controller 6 according to the embodiment of the present disclosure is configured to execute the routine shown in FIG. 4.

The routine shown in FIG. 4 is executed in the case of moving the shift lever 4a of the shifting device 4 from the D position or the B position to the N position. Specifically, in order to reduce frustration of the driver caused by the temporal reduction in the driving force during propulsion, the routine shown in FIG. 4 is configured to execute an after-mentioned shifting control to the neutral range based on a threshold time to determine an execution of an operation of the shift lever 4a to the neutral position and a neutral range maintaining action as a determination condition. For example, the routine shown in FIG. 4 is executed when the shift lever 4a is moved from the D position to the B position via the N position, or when the shift lever 4a is moved from the B position to the D position via the N position during propulsion in the forward direction. However, the control executed by the vehicle control system according to the embodiment of the present disclosure is not limited to the above-mentioned cases. For example, the shifting control to the neutral range may also be executed in a case that the shift lever 4a is moved from the position other than D and B position (e.g., the R position) to the N position, or that the shift lever 4a is moved from the default position 4c to the N position.

At step S1, it is determined whether or not the shift lever 4a is in the N position. In the momentary type shifting device 4, the shift lever 4a is normally returned to and held in the default position 4c. Therefore, the answer of step S1 will be YES in a case that the shift lever 4a is moved by the driver from the default position 4c to the N position, or that the shift lever 4a is moved by the driver from the default position 4c to the D position, the B position, or the R position via the N position. Specifically, the answer of step S1 will be YES in a case that the shift lever 4a is moved from the B position to the D position or the R position via the default position 4c and the N position, or that the shift lever 4a is moved from the D position or the R position to the B position via the default position 4c and the N position.

If the shift lever 4a is not positioned in the N position so that the answer of step S1 is NO, the routine progresses to step S2.

At step S2, the shift range of the automatic transmission 3 is not shifted to the N range, that is, the shift range currently established by the automatic transmission 3 is maintained. If the N range has been established by the automatic transmission 3 since the commencement of the routine shown in FIG. 4, the N range is maintained. Thereafter, the routine returns.

By contrast, if the shift lever 4a is positioned in the N position so that the answer of step S1 is YES, the routine progresses to step S3.

At step S3, the timer 5c starts measuring elapsed time by counting upward from a point at which the shift lever 4a is moved to the N position. That is, the timer 5c measures a period of time in which the shift lever 4a is maintained to the N position, and an execution of the operation of the shift lever 4a to the N position is determined when a count value (i.e., a measurement time) of the timer 5c exceeds the threshold time. To this end, the threshold time and an after-mentioned delay threshold time are set in advance based on results of a driving test and a simulation.

Then, at step S4, it is determined whether or not the count value of the timer 5c becomes equal to or longer than the threshold time.

If the count value of the timer 5c is still less than the threshold time so that the answer of step S4 is NO, the routine progresses to step S5.

At step S5, it is determined whether or not the shift lever 4a is positioned in the N position. That is, it is determined at step S5 whether or not the shift lever 4a is still maintained to the N position after starting the measurement of the elapsed time by the timer 5c.

If the shift lever 4a has been moved from the N position to another shift position other than the N position or returned to the default position 4c so that the answer of step S5 is NO, the routine also progresses to step S2, and thereafter returns.

By contrast, if the shift lever 4a is still maintained to the N position after starting the measurement of the elapsed time by the timer 5c so that the answer of step S5 is YES, the routine returns to step S3. That is, steps S3, S4, and S5 are repeated until the count value of the timer 5c exceeds the threshold time.

By contrast, if the count value of the timer 5c becomes equal to or longer than the threshold time so that the answer of step S4 is YES, the routine progresses to step S6.

At step S6, the timer 5c starts measuring another elapsed time in which the shift lever 4a is maintained to the N position by counting upward after the lapse of the aforementioned threshold time. In other words, the timer 5c measures another period of time in which the shift lever 4a is maintained to the N position after the lapse of the threshold time, and an execution of the neutral range maintaining action is determined when a count value (i.e., a measurement time) of the timer 5c after the lapse of the threshold time exceeds the delay threshold time. That is, the neutral range maintaining action is a determination condition for determining an execution of operation of the shift lever 4a to maintain the N range (i.e., a driver's intention to select the N range) by the driver. In the routine shown in FIG. 4, an action of the driver to hold the shift lever 4a at the N position, or to maintain the shift lever 4a to the N position may be employed as the neutral range maintaining action. Therefore, if such action of the driver to hold the shift lever 4a at the N position or to maintain the shift lever 4a to the N position is continued for the delay threshold time or longer, an execution of the neutral range maintaining action is determined. As described, the above-mentioned threshold time and the delay threshold time are set in advance based on results of a driving test and a simulation.

Then, it is determined at step S7 whether or not the count value of the timer 5c after the lapse of the threshold time becomes equal to or longer than the delay threshold time.

If the counted value of the timer 5c is still less than the delay threshold time so that the answer of step S7 is NO, the routine progresses to step S8.

At step S8, it is determined whether or not the shift lever 4a is positioned in the N position. That is, it is determined whether or not the shift lever 4a is still maintained to the N position after the timer 5c started measuring another elapsed time.

If the shift lever 4a is still maintained to the N position so that the answer of step S8 is YES, the routine returns to step S6 to continue the measurement of said another elapsed time. That is, steps S6, S7, and S8 are repeated until the count value of the timer 5c exceeds the delay threshold time.

If the count value of the timer 5c becomes equal to or longer than the delay threshold time so that the answer of step S7 is YES, the routine progresses to step S9.

At step S9, a control to shift the shift range of the automatic transmission 3 to the N range (also referred to as the N range shifting control hereinafter) is executed. Thus, in the case that the shift lever 4a being moved via the N position remains in the N position longer than the threshold time, and the shift lever 4a is further maintained to the N position for the delay threshold time or longer, the shift range is shifted to the N range.

Figure 5A:
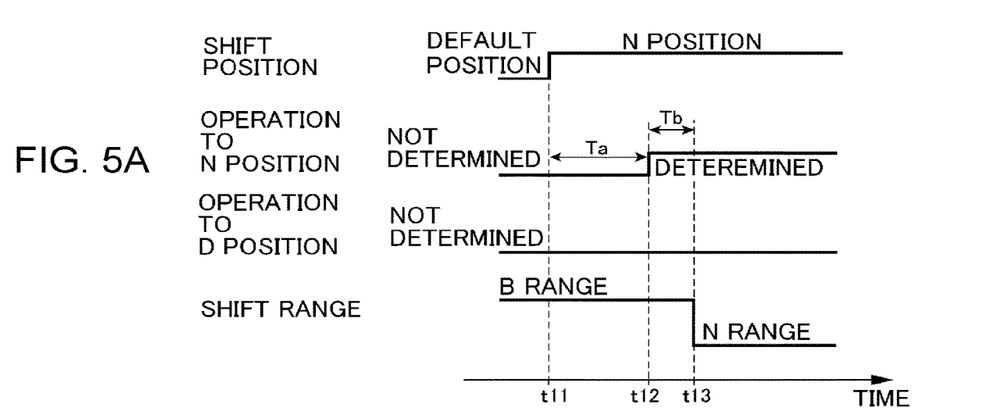
FIG. 5A is a time chart showing the delay threshold time employed in the case of shifting the shift range from the B range to the N range.

An example of such situation is shown in FIG. 5A. As illustrated in FIG. 5A, when the shift lever 4a is moved from the default position 4c to the N position at point t11 and maintained to the N position, the timer 5c starts measuring the elapsed time. Then, when the threshold time Ta has elapsed at point t12, the timer 5c starts measuring another elapsed time to determine an execution of the neutral range maintaining action. Thereafter, when the delay threshold time Tb has elapsed at point t13, that is, after the shift lever has been maintained to the N position for the delay threshold time Tb, the condition for determining an execution of the neutral range maintaining action is satisfied. Consequently, the shift range is shifted to the N range.

After shifting the shift range to the N range at step S9, the routine returns.

Whereas, if the shift lever 4a is not positioned in the N position, that is, if the shift lever 4a has been moved to a shift position other than the N position or returned to the default position 4c before the lapse of the delay threshold time Tb so that the answer of step S8 is NO, the routine progresses to step S10.

At step S10, it is determined whether the shift lever 4a is positioned in the D position or the B position. That is, it is determined whether or not the shift lever 4a has been moved to the D position or the B position after the timer 5c starts measuring another elapsed time but before the lapse of the delay threshold time.

If the shift lever 4a is positioned neither in the D position, the B position, nor the N position, that is, if the shift lever 4a has been moved to the R position or returned to the default position 4c before the lapse of the delay threshold time so that the answer of step S10 is NO, the routine also progresses to step S9 to shift the shift range to the N range. Thus, in the case that the shift lever 4a being moved via the N position is moved to the R position or returned to the default position 4c before the lapse of the delay threshold time, the shift range is shifted immediately to the N range.

Figure 5B:
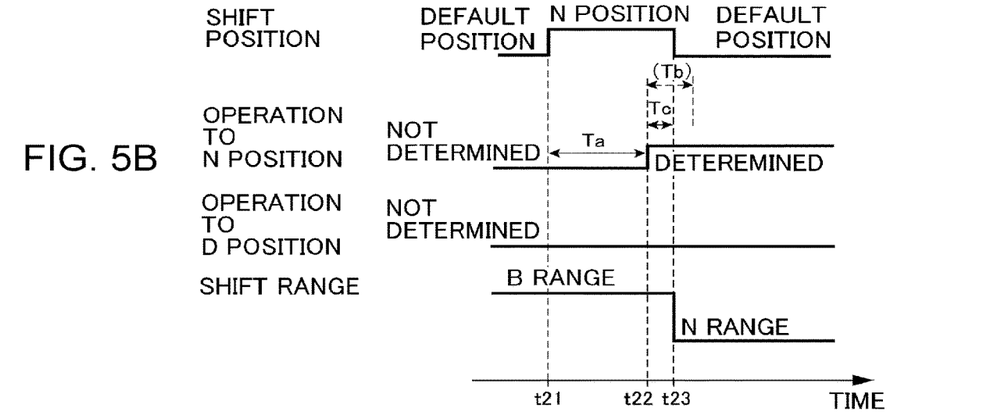
FIG. 5B is a time chart showing the shortened delay threshold time in the case of shifting the shift range from the B range to the N range.

An example of such situation is shown in FIG. 5B. As illustrated in FIG. 5B, when the shift lever 4a is moved from the default position 4c to the N position at point t21 and maintained to the N position, the timer 5c starts measuring the elapsed time. Then, when the threshold time Ta has elapsed at point t22, the timer 5c starts measuring another elapsed time to determine an execution of the neutral range maintaining action. Thereafter, when the shift lever 4a is returned to the default position 4c at point t23 before the lapse of the delay threshold time Tb, the shift range is shifted to the N range prior to the lapse of the delay threshold time Tb. In this case, since the shift lever 4a positioned at the N position is returned to the default position 4c (or moved to the R position), it can be assumed that the shift lever 4a will not be further moved to the D position or the B position. Therefore, although the delay threshold time Tb has not elapsed, the shift range is shifted to the N range after a delay time Tc which is shorter than the delay threshold time Tb. That is, in this case, an execution of the neutral range maintaining action is determined based on the fact that the shift lever 4a is maintained to the N position for the delay time Tc, and the shift range is shifted to the N range. Since the execution of the neutral range maintaining action is determined based on the delay time Tc which is shorter than the delay threshold time Tb, the time required for shifting the shift range to the N range can be shortened so that the N range shifting control can be executed smoothly.

After shifting the shift range to the N range at step S9, the routine returns.

By contrast, if the shift lever 4a is positioned in the D position or the B position, that is, that is, if the shift lever 4a has been moved to the D position or the B position before the lapse of the delay threshold time so that the answer of step S10 is YES, the routine progresses to step S11.

At step S11, the timer 5c starts measuring still another elapsed time by counting upward from a point at which the shift lever 4a is moved to the D position or the B position. That is, the timer 5c measures a period of time in which the shift lever 4a is maintained to the D position or the B position, and an execution of the operation of the shift lever 4a to the D position or the B position is determined when a count value (i.e., a measurement time) of the timer 5c exceeds another threshold time. Thus, another threshold time is a period of time employed to determine an execution of a shifting operation to the "drive range". To this end, another threshold time is set in advance based on results of a driving test and a simulation.

Then, at step S12, it is determined whether or not the count value of the timer 5c becomes equal to or larger than said another threshold time.

If the count value of the timer 5c is still less than said another threshold time so that the answer of step S12 is NO, the routine progresses to step S13.

At step S13, it is determined whether the shift lever 4a is positioned in the D position or the B position. That is, it is determined whether or not the shift lever 4a has been maintained to the D position or the B position since the timer 5c starts measuring said still another elapsed time.

If the shift lever 4a is positioned in the D position or the B position, that is, if the shift lever 4a has been maintained to the D position or the B position since the timer 5c starts measuring said still another elapsed time so that the answer of step S13 is YES, the routine returns to step S11. That is, steps S11, S12, and S13 are repeated until the count value of the timer 5c exceeds said another threshold time.

By contrast, if the count value of the timer 5c becomes equal to or longer than said another threshold time so that the answer of step S12 is YES, the routine progresses to step S14.

At step S14, a control for shifting the shift range of the automatic transmission 3 to the D range or the B range is executed. That is, in this case, the shift lever 4a which has been moved to (or passed through) the N position is further moved to the D position or the B position before the lapse of the delay threshold time, and maintained to the D position or the B position for longer than said another threshold time. In this case, therefore, the shift range is shifted to the D range or the B range.

Figure 5C:
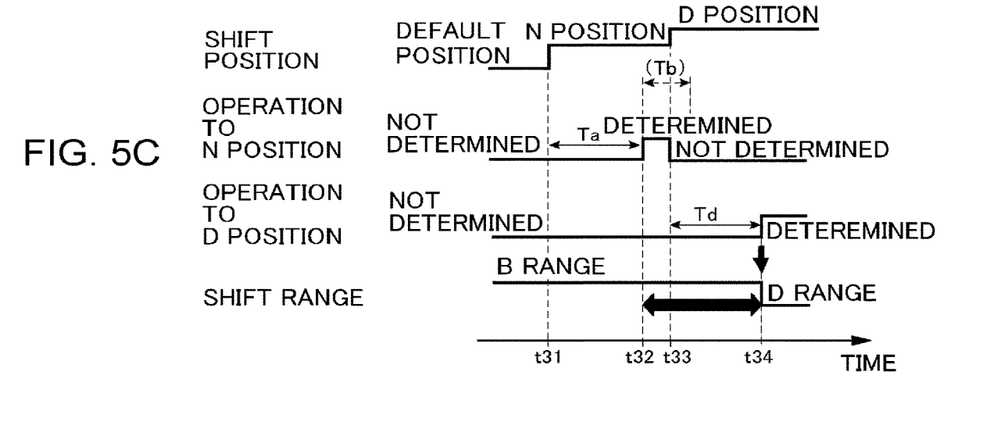
FIG. 5C is a time chart showing an example of avoiding an occurrence of temporal drop in the driving force in the case of shifting the shift range from the B range to the D range.

An example of such situation is shown in FIG. 5C. As illustrated in FIG. 5C, when the shift lever 4a is moved from the default position 4c to the N position at point t31 and maintained to the N position, the timer 5c starts measuring elapsed time. Then, when the threshold time Ta has elapsed at point t32, the timer 5c starts measuring another elapsed time to determine an execution of the neutral range maintaining action. Thereafter, when the shift lever 4a is moved to the D position at point t33, the measurement of another elapsed time is cancelled. In this situation, therefore, the shift range is not shifted to the N range. Instead, the timer 5c starts measuring still another elapsed time from point t33 to determine an execution of a shifting operation to the drive range. Thereafter, when another threshold time Td has elapsed at point t34, the shift range is shifted to the D range. In this case, since the shift lever 4a is moved from the N position to the D position or the B position before the lapse of the delay threshold time Tb, the shift range of the automatic transmission 3 is shifted to the D range or the B range without establishing the N range. Therefore, temporal reduction in the driving force can be prevented in the situation where the shift lever 4a is moved from the default position to the D position or the B position.

According to the exemplary embodiment of the present disclosure, the "delay threshold time" to delay the shifting operation to N range may be employed only in the case that the shift lever 4a is expected to be moved to the D position or the B position. In this case, the delay threshold time Tb may be shortened taking account of time required for the shift lever 4a to pass through the N position. That is, an estimated time of the shift lever 4a to pass through the N position which is shorter than the above-explained delay threshold time Tb may be employed as the delay threshold time Tb. Consequently, the time required for shifting the shift range to the D range or the B range can be shortened. That is, the shift range may be shifted smoothly to the D range or the B range.

After shifting the shift range to the D range or the B range at step S14, the routine returns.

Whereas, if the shift lever 4a is further moved from the D position or the B position to the other shift position (i.e., the R position or the N position) or returned to the default position 4c prior to the lapse of above-mentioned another threshold time so that the answer of step S13 is NO, the routine also progresses to step S9 to shift the shift range to the N range. In this case, since the shift lever 4a moved to the D position or the B position is further moved to the R position, the N position, or the default position 4c prior to the lapse of another threshold time, the shift range is temporarily shifted to the N range. That is, the shift range is shifted from the D range or the B range to the R range or the N range or maintained to the D range or the B range. Therefore, it would not really matter even if the driving force drops temporarily when shifting the shift range from the D range or the B range to the R range or the N range. For example, in the case of shifting the shift range from the D range or the B range to the R range, a direction of application of the driving force is reversed. In this case, therefore, it would not really matter even if the driving force drops temporarily when the shift range is temporarily shifted to N range. Otherwise, the driving force will not drop in the case that the shift range is maintained to the D range or the B range. Thus, the shift range may be shifted immediately to the N range before the lapse of another threshold time. For this reason, the time required for shifting the shift range from the D range or the B range to the R range or the N range can be shortened. That is, the shift range may be shifted smoothly to the R range or the N range.

After shifting the shift range to the N range at step S9, the routine returns.

According to the exemplary embodiment of the present disclosure, an action to move the shift lever 4a from the N position to the default position 4c may be employed as the neutral range maintaining action to execute the foregoing shifting control to the neutral range. For example, the shifting control to the neutral range may also be executed when the driver releases his/her hand from the shift lever 4a after the lapse of the threshold time Ta to return the shift lever 4a from the N position to the default position 4c. In this case, when the shift lever 4a is moved to a position other than the N position and the default position 4c, the shift range is shifted to a range other than the N range without establishing the N range even after the lapse of the threshold time Ta.

Figure 6A:
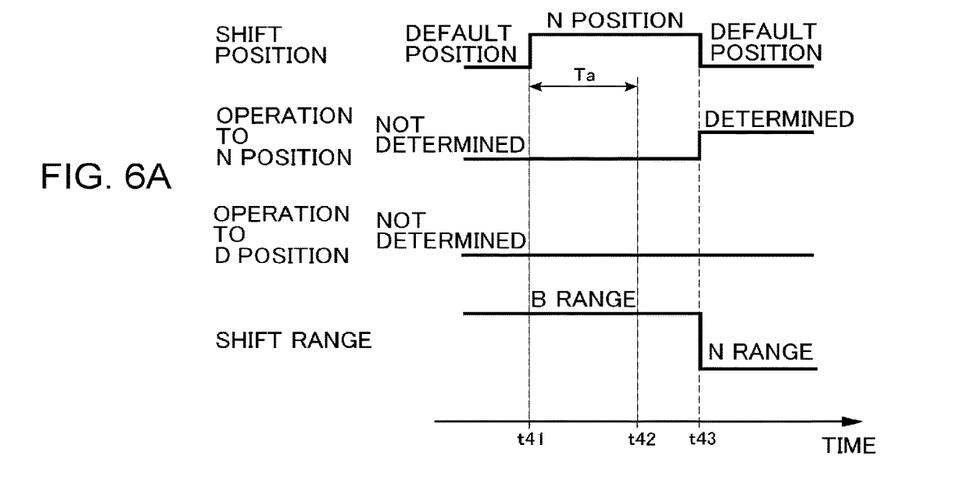
FIG. 6A is a time chart showing an example of the neutral range maintaining action in the case of shifting the shift range from the B range to the N range.

An example of such situation is shown in FIG. 6A. In the example shown in FIG. 6A, the shift range is set to the B range, and the shift lever 4a is moved from the B position to the D position via the default position 4c and the N position. In this case, when the shift lever 4a is moved from the default position 4c to the N position at point t41, the timer 5c starts measuring elapsed time. In this situation, although the threshold time Ta has elapsed at point t42, the shift range is maintained to the B range until the shift lever 4a is moved to the default position 4c again at point t43. Thus, the shift range is shifted to the N range based on the fact that the shift lever 4a is moved to the default position 4c after the lapse of the threshold time Ta. Therefore, it is possible to prevent the temporal reduction in the driving force when the shift range is further shifted to other range.

Figure 6B:
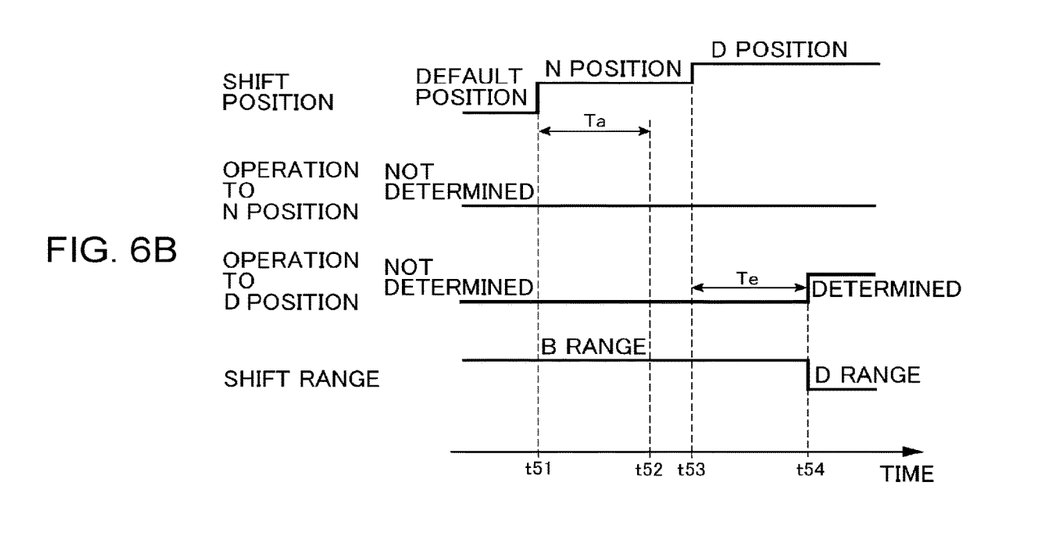
FIG. 6B is a time chart showing an example of avoiding an occurrence of temporal drop in the driving force in the case of shifting the shift range from the B range to the D range.

In the example shown in FIG. 6B, the shift range is set to the B range, and the shift lever 4a is moved from the default position 4c to the N position at point t51 and the timer 5c starts measuring elapsed time. In this case, the threshold time Ta elapsed at point t52 but the shift lever 4a is still maintained to the N position. Then, the shift lever 4a is moved to the D position at point t53, but the shift range is maintained to the B range until the lapse of another threshold time Te and shifted to the D range at point t54. Thus, the shift range is shifted directly from the B range to D range without establishing the N range after the lapse of the threshold time Ta. In this case, therefore, a demand to shift to the N range may be determined promptly, and the temporal reduction in the driving force can be prevented.

According to the exemplary embodiment of the present disclosure, the condition for determining an execution of the neutral range maintaining action may be altered depending on the traveling condition of the vehicle Ve. For example, it would not really matter even if the driving force drops temporarily when the vehicle Ve is stopped, when the vehicle Ve is traveling at a very low speed, or when the brake pedal is depressed to decelerate the vehicle Ve. In those cases, therefore, the condition for determining an execution of the neutral range maintaining action may be simplified or the determination of an execution of the neutral range maintaining action may be omitted so as to shift the shift range promptly to the N range in accordance with the traveling condition of the vehicle Ve.

For example, the shift range may be shifted to the N range in a case that the shift lever 4a moved to the N position is maintained to the N position even after the lapse of the threshold time during propulsion at a speed higher than a predetermined level. In addition, the shift range may be shifted immediately to the N range after the lapse of the threshold time without determining the execution of the neutral range maintaining action, in a case that the vehicle Ve propels at a speed lower than the predetermined level.

Further, the shift range may be shifted to the N range in a case that the shift lever 4a moved to the N position is maintained to the N position even after the lapse of the threshold time during propulsion at a speed higher than the predetermined level, during propulsion at an extremely low speed without braking the vehicle Ve, or while the vehicle Ve is stopping. Furthermore, the shift range may be shifted immediately to the N range after the lapse of the threshold time without determining the execution of the neutral range maintaining action, in a case that the shift lever 4a is maintained to the N position until the lapse of the threshold time during propulsion at an extremely low speed without braking the vehicle Ve, or while the vehicle Ve is stopping.

Thus, according to the exemplary embodiment of the present disclosure, the shift range of the automatic transmission 3 may be shifted smoothly to the N range in response to the operation of the momentary type shifting device 4. In addition, the temporal reduction in the driving force can be prevented certainly when shifting the shift range of the automatic transmission 3 via the N range.

What is claimed is:
1. A vehicle control system, comprising:
an automatic transmission that is mounted on a vehicle, and in which a shift range is selectable from at least
a forward drive range in which the vehicle is propelled forward at a normal speed ratio,
a deceleration drive range in which the vehicle is propelled forward at a speed ratio that is larger than that in the forward drive range, and
a neutral range in which a power transmission is interrupted;

a shifting device having an operating device that is operated manually by a driver along a predetermined guide route; and a controller that controls the automatic transmission in response to an operation of the shifting device, wherein the shifting device is activated only when the operating device is moved from a default position to a desired shift position thereby establishing the shift range corresponding to the desired shift position of the operating device, and inactivated by releasing the operating device to return the operating device to the default position, a neutral position corresponding to the neutral range and the default position are located in the predetermined guide route between a drive position corresponding to the forward drive range and a deceleration drive position corresponding to the deceleration drive range, the controller is configured to establish the neutral range in a case that the operating device which is moved to the neutral position is maintained to the neutral position for a threshold time for determining an execution of an operation of the operating device to the neutral position, and that a neutral range maintaining action is executed after a lapse of the threshold time, the neutral range maintaining action includes: an operation to return the operating device from the neutral position to the default position, and an operation to maintain the operating device to the neutral position for a delay threshold time for determining an execution of the neutral range maintaining action, and the controller is further configured to establish the neutral range after a delay time which is shorter than the delay threshold time, in a case that the operating device is moved from the neutral position to the default position or a position other than the drive position and the deceleration drive position before a lapse of the delay threshold time.

2. A vehicle control system, comprising:

an automatic transmission that is mounted on a vehicle, and in which a shift range is selectable from at least
  a forward drive range in which the vehicle is propelled forward at a normal speed ratio,
  a deceleration drive range in which the vehicle is propelled forward at a speed ratio that is larger than that in the forward drive range, and
  a neutral range in which a power transmission is interrupted;

a shifting device having an operating device that is operated manually by a driver along a predetermined guide route; and a controller that controls the automatic transmission in response to an operation of the shifting device, wherein the shifting device is activated only when the operating device is moved from a default position to a desired shift position thereby establishing the shift range corresponding to the desired shift position of the operating device, and inactivated by releasing the operating device to return the operating device to the default position, a neutral position corresponding to the neutral range and the default position are located in the predetermined guide route between a drive position corresponding to the forward drive range and a deceleration drive position corresponding to the deceleration drive range, the controller is configured to establish the neutral range in a case that the operating device which is moved to the neutral position is maintained to the neutral position for a threshold time for determining an execution of an operation of the operating device to the neutral position, and that a neutral range maintaining action is executed after a lapse of the threshold time, wherein the controller is further configured to establish the neutral range in a case that the operating device is moved from the drive position or the deceleration drive position to the neutral position, that the operating device is maintained to the neutral position for the threshold time, and that the neutral range maintaining action is executed after the lapse of the threshold time, the neutral range maintaining action includes: an operation to return the operating device from the neutral position to the default position, and an operation to maintain the operating device to the neutral position for a delay threshold time for determining an execution of the neutral range maintaining action, and the controller is further configured to establish the neutral range after a delay time which is shorter than the delay threshold time, in a case that the operating device is moved from the neutral position to the default position or a position other than the drive position and the deceleration drive position before a lapse of the delay threshold time.

* * * * *